(No Model.) 2 Sheets—Sheet 1.
R. KREINBERG.
MOLDING PLANE.
No. 421,407. Patented Feb. 18, 1890.
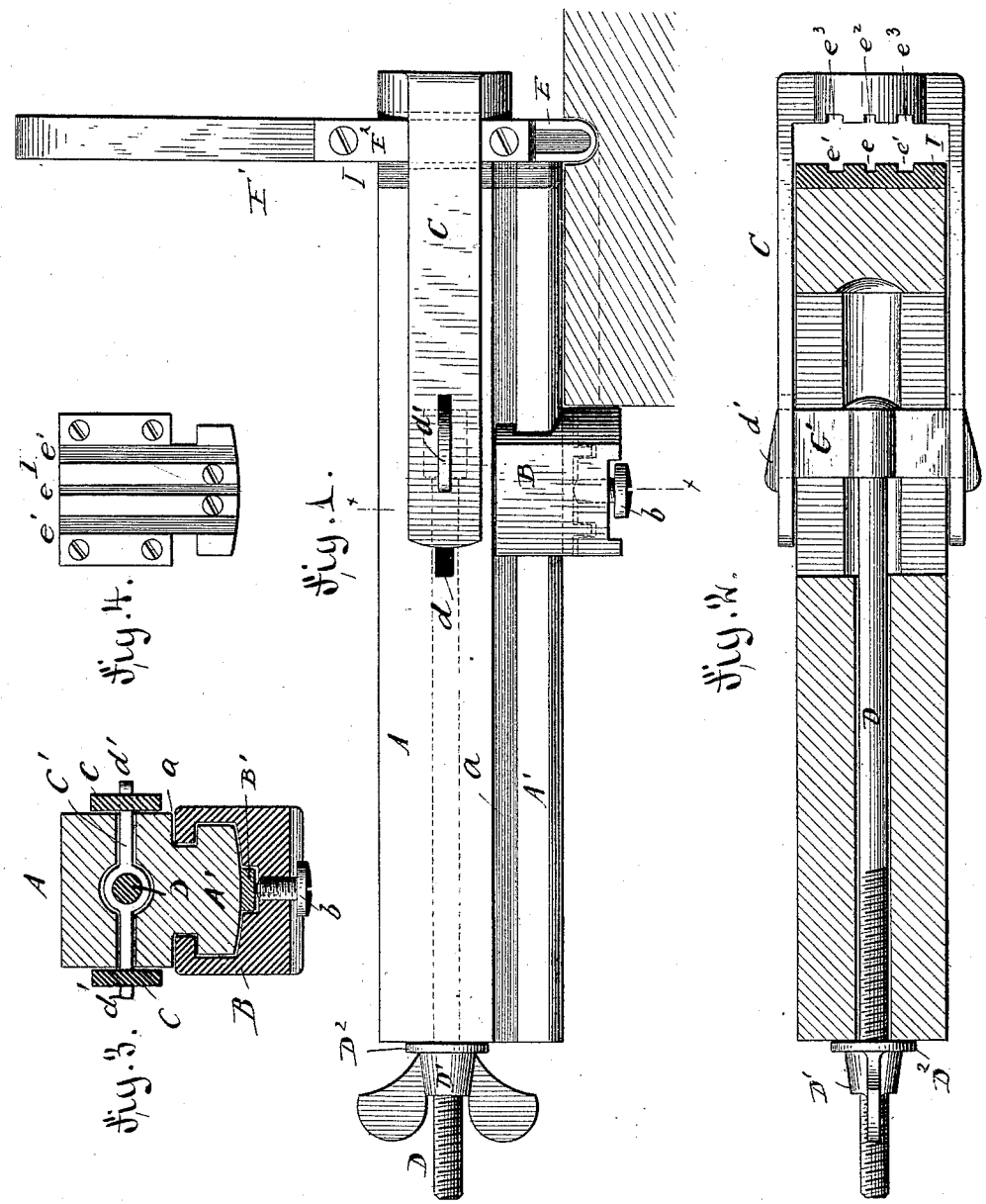
WITNESSES:
INVENTOR

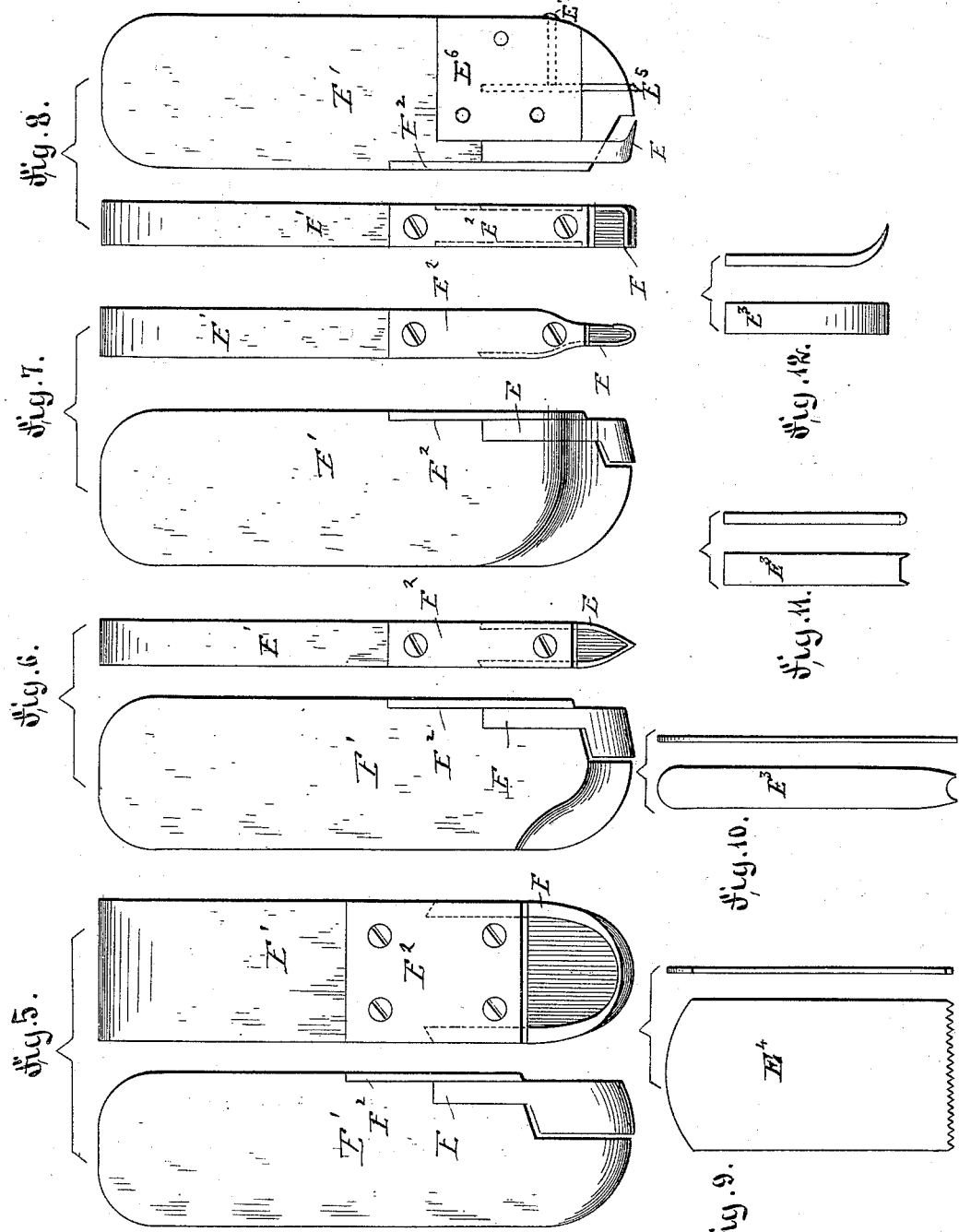

UNITED STATES PATENT OFFICE.

RICHARD KREINBERG, OF JERSEY CITY, NEW JERSEY.

MOLDING-PLANE.

SPECIFICATION forming part of Letters Patent No. 421,407, dated February 18, 1890.

Application filed April 24, 1889. Serial No. 308,398. (No model.)

*To all whom it may concern:*

Be it known that I, RICHARD KREINBERG, of Jersey City, in the county of Hudson and State of New Jersey, a citizen of the United States, have invented certain new and useful Improvements in Molding-Planes, of which the following is a specification.

This invention relates to an improved molding tool or plane which is intended for use in molding all kinds of straight or circular work, the tool being also adapted for preparatory work—such as advance cutting and plowing—and finishing work, such as scraping the molded parts.

The invention consists of a molding-tool the stock of which is provided at one end with a stirrup, between which and the end of the stock is introduced the molding or other tool, said stirrup being rigidly applied to the tool by a transverse cross-piece that passes through slots of the stock and engages the slotted inner ends of the stirrup and by a screw-bolt that extends longitudinally through the stock and is provided with a thumb-nut at the outer threaded end. The side of the stock is provided with longitudinal grooves, in which is guided a correspondingly-shaped slide-piece, so as to serve as a guide for the molding-tool, according as the same is used on the straight or curved work.

The invention consists, further, of certain details of construction and combination of parts, which will be fully described hereinafter, and finally pointed out in the claims.

In the accompanying drawings, Figure 1 represents a side elevation of my improved molding tool or plane. Fig. 2 is a longitudinal horizontal sectional view of the same. Fig. 3 is a vertical transverse section on line $x\ x$, Fig. 1. Fig. 4 is a face view of the end plate of the stock. Figs. 5 to 8 are face and edge views of different cutters that can be used with my improved molding-plane and the blade-stock for the same. Figs. 9 to 12 are detail views showing different blades that can be used with my improved molding-plane.

Similar letters of reference indicate corresponding parts.

In the drawings, A represents the stock of my improved molding-plane, which is preferably made of hard wood and provided in each side with a longitudinal groove $a$, and below the same with a narrow part A', having a convex under side, along which is guided a slide-piece B, which is recessed in such a manner as to correspond to the bottom piece A' of the stock A and engage the grooves $a$ of the same. The slide-piece B is adjusted on the stock A by a set-screw $b$, which presses against a plate B' in the slide and resting on the convex bottom of the surface of the stock A, so as to secure the slide-piece in any desired position on the stock. One face of the slide-piece B is made straight, while the opposite face is made convex, so that the slide-piece can be used for guiding the plane along a straight or curved edge, accordingly as straight or curved work has to be done.

To one end of the stock A is applied a U-shaped sliding stirrup C, which stirrup is connected at its inner longitudinally-open end by a cross-piece C', provided with end lugs $d'$, said lugs engaging the slotted ends of the stirrup, so as to permit the adjustment of the stirrup toward or away from the end of the stock A.

The adjustment of the stirrup C is accomplished by a longitudinal screw-rod D, which is connected to the transverse piece C' and provided with a thumb-nut D' at its threaded end, the screw-bolt passing through a longitudinal opening in the stock A.

Between the thumb-nut D' and the end of the stock A a washer $D^2$ is provided for protecting the stock A.

The transverse piece C' is passed through longitudinal side slots $d$ of the stock A, the length of the slots defining the distance at which the outer end of the stirrup C can be adjusted from the end of the stock A.

The end of the stock A is provided with an end plate $l$, having grooves $e\ e'$, the outer grooves being wider than the central groove, said grooves, with the grooves $e^2\ e^3$ in the end piece of the stirrup, serving for the purpose of holding the different single-shanked cutters, saws, or blades shown in Figs. 9 to 12.

For molding any one of the molding-cutters is used, which are formed of a blade-stock E', that is recessed for the shanks of the U-shaped blade E, said shanks being beveled and secured to the recessed edges of the stock E' by a fastening-plate E², that is firmly secured by fastening-screws.

For planing the U-shaped blade is sharpened at the inner edge and made tapering toward the outer edge, so as to pass readily through the groove to be cut thereby.

The preparatory work—such as advance cutting and plowing—is done by the advance cutters and plows E³, as shown in Figs. 10 to 12, said tools being respectively inserted into the grooves e' e³ e' e³ in the end plate l of the stock and in the inner face of the stirrup.

The advance cutting and plowing facilitates the work of the grooving or molding tool.

When the cutting of the groove or molding is accomplished, the scraping of the same is done by a suitable scraping-cutter, which is inserted between the end of the stock and the inner face of the stirrup.

When sawing has to be done, a small saw E⁴, Fig. 9, is inserted in the grooves e e² of the stirrup C and the stock A, all the blades being firmly held by tightly applying the stirrup to the blade or tool and holding it rigidly in position by adjusting the thumb-nut of the stirrup-adjusting screw-rod D.

The U-shaped cutting-blades used in connection with my molding-plane have shanks beveled at the rear edges, which fit into corresponding recesses of the stock E', so as to be firmly held in position by the fastening-plate attached to the end of the blade-stock E'.

Small grooving-tools are provided with but one shank, in order that they may be sharpened with greater facility, as shown in Fig. 7. In some cases the grooving-tool may be provided with a suitable scratch or advance cutter E⁵, which is retained in position by side plates E⁶ and a set-screw E⁷, as shown in Fig. 8.

My improved plane is adapted for grooving the hand-rails of stair-balustrades and for doing all other grooved or molded work, which heretofore had to be carved out by means of a number of different tools, so that the work is greatly simplified and facilitated.

Having thus described my invention, I claim as new and desire to secure by Letters Patent—

1. A planing-tool composed of a stock having an adjustable guide-piece at its lower part, an adjustable stirrup at one end of the stock, a cutting or other tool interposed between the end of the stock and the head of the stirrup, and a screw-rod for adjusting the stirrup on the stock, substantially as set forth.

2. The combination of a stock having a transverse slot at its middle part, a U-shaped stirrup applied to one end of the stock, a transverse plate engaging the free ends of the stirrup, a longitudinal screw-rod connected to said transverse piece, and a thumb-nut on the outer threaded end of the screw-rod, substantially as set forth.

3. The combination of a grooved stock having a grooved end or head, a stirrup applied to the grooved end of the stock and being provided with a grooved inner face, a transverse piece that engages slots of the stirrup, a longitudinal screw-bolt in the stock for locking the transverse piece to the stirrup, and grooving or other tools inserted between the grooved ends of the stock and the grooved face of the stirrup, substantially as set forth.

In testimony that I claim the foregoing as my invention I have signed my name in presence of two subscribing witnesses.

RICHARD KREINBERG.

Witnesses:
PAUL GOEPEL,
CARL KARP.